United States Patent
Yatokoro (10) Patent No.: US 7,579,575 B2
(45) Date of Patent: Aug. 25, 2009

(54) ELECTRON MULTIPLYING SOLID-STATE IMAGE PICKUP APPARATUS, METHOD AND COMPUTER PROGRAM PRODUCT FOR ADJUSTING ELECTRON MULTIPLYING GAIN

(76) Inventor: Masahiro Yatokoro, c/o NEC Corporation, 7-1, Shiba 5-chome, Minato-ku, Tokyo (JP)

( * ) Notice: Subject to any disclaimer, the term of this patent is extended or adjusted under 35 U.S.C. 154(b) by 0 days.

(21) Appl. No.: 12/050,303

(22) Filed: Mar. 18, 2008

(65) Prior Publication Data

US 2008/0230680 A1 Sep. 25, 2008

(30) Foreign Application Priority Data

Mar. 19, 2007 (JP) ............... 2007-070776

(51) Int. Cl.
*H01J 40/14* (2006.01)
(52) U.S. Cl. .................... 250/207; 250/214 VT
(58) Field of Classification Search .......... 250/208.1, 250/207, 214 VT, 214 R; 348/216.1, 215.1, 348/207.99, 284–295; 313/492–544
See application file for complete search history.

(56) References Cited

U.S. PATENT DOCUMENTS 6,720,996 B1 * 4/2004 Suyama et al. ........... 348/216.1

FOREIGN PATENT DOCUMENTS

| JP | 06233332 A | 8/1994 |
|----|------------|--------|
| JP | 2003324502 A | 11/2000 |
| JP | 2006203222 A | 8/2006 |
| JP | 2007274050 A | 10/2007 |

* cited by examiner

*Primary Examiner*—Que T Le (57) ABSTRACT

An electron multiplying solid-state image pickup apparatus which obtains a desired electron multiplying gain through adjusting a voltage applied to an electron multiplying gate electrode includes an electron multiplying unit, a test signal supply unit and a control unit. The electron multiplying unit multiplies an electron corresponding to an input signal by an electric field generated by the applied voltage. The test signal supply unit supplies a test signal to the electron multiplying unit. The control unit compares a level of the test signal multiplied by the electron multiplying unit with an expected level determined in advance, and adjusts the voltage applied to the electron multiplying gate electrode so that the multiplied test signal level is equal to or larger than the expected level.

13 Claims, 10 Drawing Sheets

ELECTRON MULTIPLYING SOLID-STATE IMAGE PICKUP APPARATUS, METHOD AND COMPUTER PROGRAM PRODUCT FOR ADJUSTING ELECTRON MULTIPLYING GAIN

RELATED APPLICATIONS

This application is based on Japanese Patent Application No. JP 2007-070776 filed on Mar. 19, 2007, and including a specification, claims, drawings and summary. The disclosure of the above Japanese Patent Application is incorporated herein by reference in its entirety.

BACKGROUND OF THE INVENTION

1. Field of the Invention

The present invention relates to an electron multiplying solid-state image pickup apparatus, a method and a computer program product for adjusting an electron multiplying gain.

2. Description of the Related Art

An electron multiplying solid-state image pickup device is well known as a solid-state image pickup device with high sensitivity. For example, Japanese Patent Application Laid-Open No. 2006-203222 and Japanese Patent Application Laid-Open No. 2007-274050 disclose the electron multiplying solid-state image pickup device which multiplies electrons using impact ionization. Here, the impact ionization means that electrons accelerated by an electric field collide with a crystal lattice to generate a pair of an electron and a hole.

Figure 8:
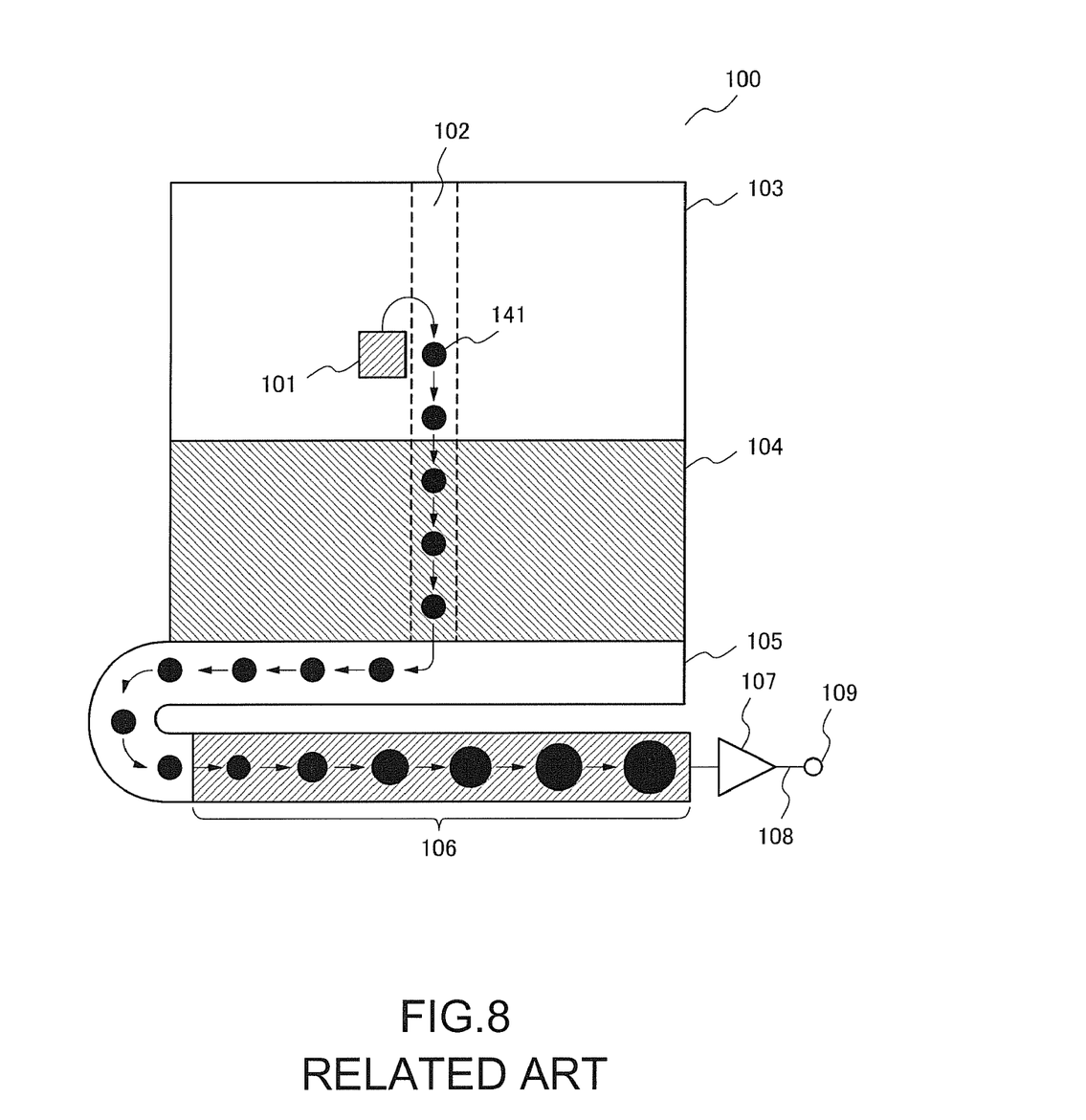
FIG. 8 is an example of a basic operation of the electron multiplying CCD image pickup device using impact ionization as the related art.

FIG. 8 shows a basic operation of an electron multiplying CCD (Charged Coupled Device) image pickup device using the impact ionization, which is disclosed in Japanese Patent Application Laid-Open No. 2007-274050. The electron multiplying CCD image pickup device 100 includes an image pickup area 103 including a photodiode 101 and a vertical CCD register 102, and a storage area 104 which accumulates signal charge transferred from the image pickup area 103. A horizontal CCD register 105 receives the signal charge accumulated in the storage area 104 and transfers the signal charge in a horizontal direction. An electron multiplying CCD register 106 connects with the horizontal CCD register 105, and multiplies the transferred signal charge. An output amplifier 107 converts the signal charge amplified by the electron multiplying CCD register 106 into a voltage signal 108. The voltage signal 108 is outputted from an output terminal 109 to the outside.

Figure 9:
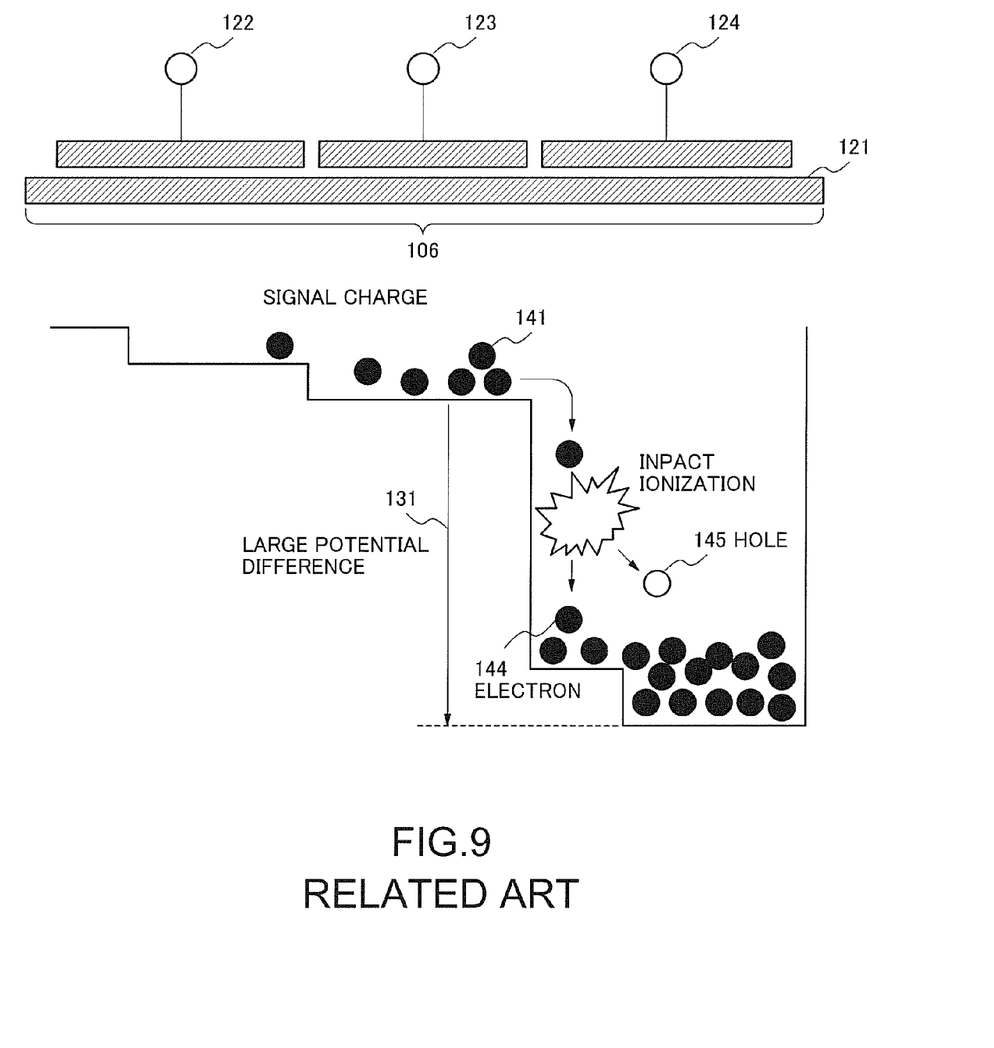
FIG. 9 shows a cross section and a potential distribution profile of an electron multiplying CCD register shown in FIG. 8.

FIG. 9 shows a cross section and an electric potential distribution profile of the electron multiplying CCD register 106 shown in FIG. 8. The electron multiplying CCD register 106 includes a gate oxide film 121. A first horizontal transfer gate electrode 122, a second horizontal transfer gate electrode 123 and a electron multiplying gate 124 are separately formed on a top surface of the gate oxide film 121 at a predetermined intervals.

Hereinafter, operations of the electron multiplying CCD image pickup device 100 will be described. The photodiode 101 generates signal charge 141 through photoelectric conversion. The vertical CCD register 102 read the signal charge 141. The signal charge 141 read by the vertical CCD register 102 is vertically transferred from the image pickup area 103 to the storage area 104 and reaches the horizontal register 105. The signal charge 141 is further horizontally transferred through the horizontal CCD register 105 to the electron multiplying CCD register 106. The electron multiplying CCD register 106 includes a large potential difference (high electric field) 131 which is generated due to applying high voltage to the electron multiplying gate electrode 124. An electron as the signal charge 141 is accelerated due to the large potential difference 131 and collides with a silicon crystal lattice. The collision causes the impact ionization to generate a new pair of an electron 144 and a hole 145. Then, the hole 145 of the generated pair flows to a silicon substrate to disappear. The electron 144 is captured in a potential well. Several hundred electron multiplying gate electrodes 124 are provided and processes described above are repeated at each of the several hundred electron multiplying gate electrodes 124. As a result of the repeated processes, it is possible to multiply the signal charge 141.

Figure 10:
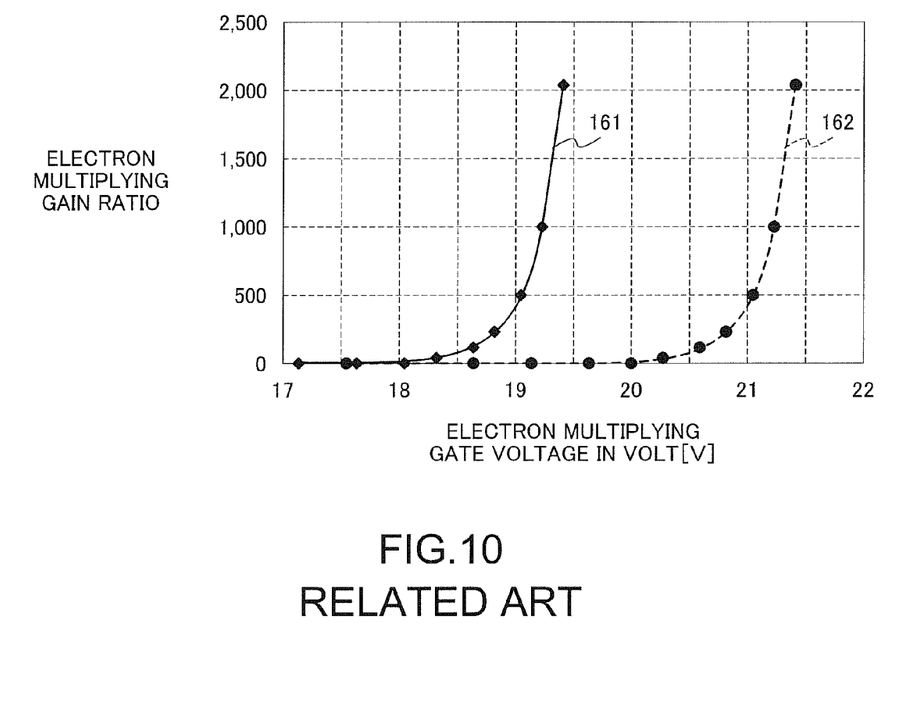
FIG. 10 is a characteristic diagram showing a relation between electron multiplying gate voltage and an electron multiplying gain of the electron multiplying CCD image pickup device as the related art.

FIG. 10 shows a relation between electron multiplying gate voltage and an electron multiplying gain of the electron multiplying CCD image pickup device 100 which carries out the above mentioned operations. A characteristic curve 161 in FIG. 10 indicates that an electron multiplying gain becomes high as the voltage applied to the electron multiplying gate electrodes 124 becomes high. That is, the electron multiplying gain is determined based on the voltage applied to the electron multiplying gate electrodes 124.

Further, Japanese Patent Application Laid-Open No. 2000-324502 discloses an image pickup apparatus which calculates information on aging of color characteristic of the image pickup apparatus, based on calibrated color characteristics and stored initial color characteristics, and then processes an image signal according to the information on the aging. Japanese Patent Application Laid-Open No. 1994-233332 discloses a signal generating apparatus which generates a test signal for testing a signal processing circuit of CCD camera.

SUMMARY OF THE INVENTION

An exemplary object of the present invention is to provide an electron multiplying solid-state image pickup apparatus, a method and a computer program product for adjusting an electron multiplying gain, which can provide an appropriate electron multiplying gain.

According to one aspect of the invention, an electron multiplying solid-state image pickup apparatus which obtains a desired electron multiplying gain through adjusting a voltage applied to an electron multiplying gate electrode includes an electron multiplying unit, a test signal supply unit and a control unit. The electron multiplying unit multiplies an electron corresponding to an input signal by an electric field generated by the applied voltage. The test signal supply unit supplies a test signal to the electron multiplying unit. The control unit compares a level of the test signal multiplied by the electron multiplying unit with an expected level determined in advance, and adjusts the voltage applied to the electron multiplying gate electrode so that the multiplied test signal level is equal to or larger than the expected level.

According to another aspect of the invention, a method for adjusting an electron multiplying gain of an electron multiplying solid-state image pickup apparatus which obtains a desired electron multiplying gain through adjusting a voltage applied to an electron multiplying gate electrode includes the steps of supplying a test signal to an electron multiplying unit which multiplies an electron corresponding to an input signal by an electric field generated by the applied voltage; comparing a level of the test signal multiplied by the electron multiplying unit with an expected level determined in advance; and adjusting the voltage applied to the electron multiplying gate electrode so that the multiplied test signal level is equal to or larger than the expected level.

According to another aspect of the invention, a computer program product for adjusting an electron multiplying gain of an electron multiplying solid-state image pickup apparatus which obtains a desired electron multiplying gain through adjusting a voltage applied to an electron multiplying gate electrode includes a computer-readable storage medium having computer-readable program code portions stored therein. The computer-readable program code portions includes a first executable portion configured to supply a test signal to an electron multiplying unit which multiplies an electron corresponding to an input signal by an electric field generated by the applied voltage, a second executable portion configured to compare a level of the test signal multiplied by the electron multiplying unit with an expected level determined in advance, and a third executable portion configured to adjust the voltage applied to the electron multiplying gate electrode so that the multiplied test signal level is equal to or larger than the expected level.

BRIEF DESCRIPTION OF THE DRAWINGS

Exemplary features and advantages of the present invention will become apparent from the following detailed description when taken with the accompanying drawings in which.

DETAILED DESCRIPTION OF THE EXEMPLARY EMBODIMENTS

Figure 1:
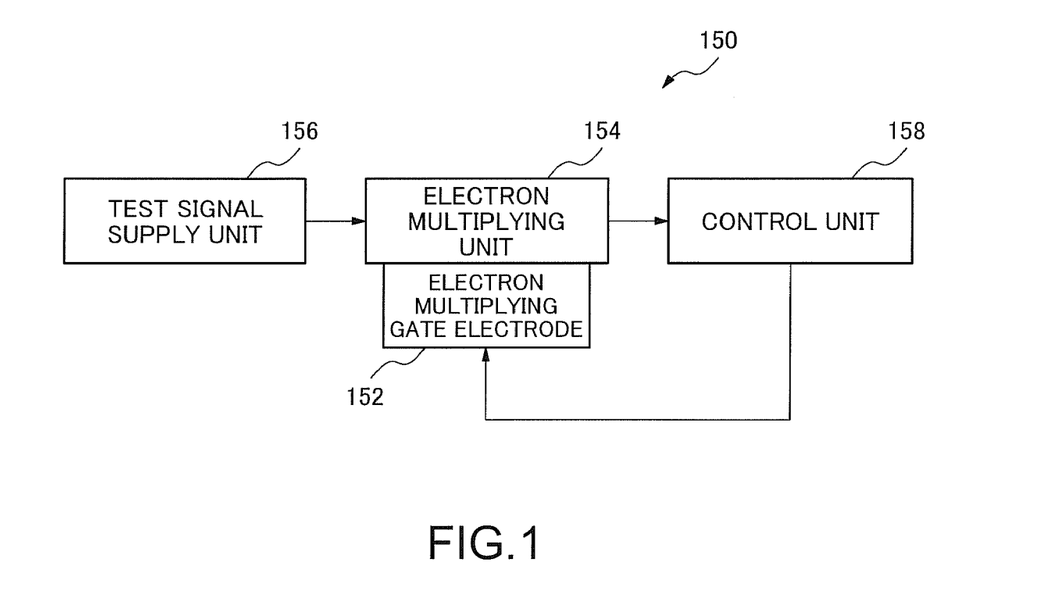
FIG. 1 is a block diagram of an example of an electron multiplying solid-state image pickup apparatus according to a first exemplary embodiment of the present invention.

FIG. 1 is a block diagram of an example of an electron multiplying solid-state image pickup apparatus 150 according to a first exemplary embodiment of the present invention.

When adjusting a voltage which is applied to an electron multiplying gate electrode 152, the electron multiplying solid-state image pickup apparatus 150 can obtain a desired electron multiplying gain. The electron multiplying solid-state image pickup apparatus 150 includes an electron multiplying unit 154, a test signal supply unit 156 and a control unit 158. The electron multiplying unit 154 multiplies electrons as an input signal by an electric field generated by the voltage which is applied to the electron multiplying gate electrode 152. The test signal supply unit 156 supplies the electron multiplying unit 154 with a predetermined test signal. The control unit 158 compares a level of the test signal whose electrons are multiplied by the electron multiplying unit 154 with an expected level which is set in advance. Further, the control unit 158 adjusts the voltage applied to the electron multiplying gate electrode 152 so that a level of the multiplied test signal becomes equal to or larger than the expected level. According to the configuration and the operations described above, the electron multiplying solid-state image pickup apparatus 150 can obtain an appropriate electron multiplying gain.

Figure 2:
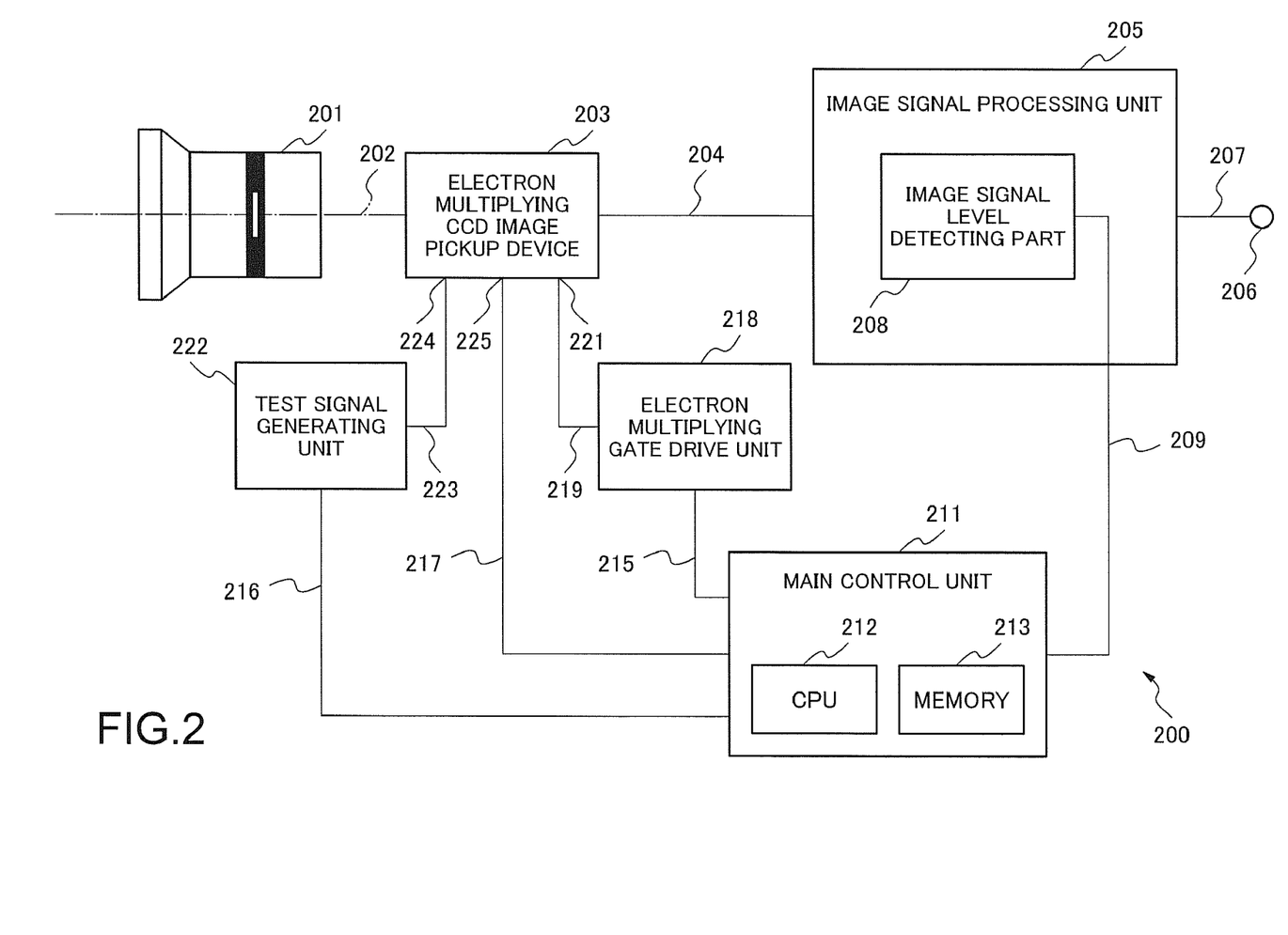
FIG. 2 is a block diagram of example of an electron multiplying solid-state image pickup apparatus according to a second exemplary embodiment of the present invention.

FIG. 2 is a control block diagram of an example of an electron multiplying solid-state image pickup apparatus according to a second embodiment of the present invention. Hereinafter, an electron multiplying CCD (Charged Coupled Device) image pickup apparatus 200 using the impact ionization will be described as an example of the electron multiplying solid-state image pickup apparatus. The electron multiplying CCD image pickup apparatus 200 includes an optical lens 201 for imaging a subject. A light receiving surface of an electron multiplying CCD image pickup device 203 is arranged at focal point of the optical lens 201 where a light 202 passing therethrough converges. The electron multiplying CCD image pickup device 203 converts the incident light into signal charge, multiplies the signal charge, converts the multiplied signal charge into a voltage signal and outputs the voltage signal as a voltage signal 204 in a time-series manner. The voltage signal 204 is sent to an image signal processing unit 205.

The image signal processing circuit 205 processes the received voltage signal 204 to generate an image signal 207 and output the image signal 207 to an output terminal 206. The image signal processing unit 205 includes an image signal level detecting part 208. The image signal level detecting part 208 detects a peak level of the image signal and outputs the peak level to a main control unit 211 as an image peak level signal 209.

The main control unit 211 controls whole of the electron multiplying CCD image pickup apparatus 200. The main control unit 211 includes a CPU (Central Processing Unit) 212 and a memory 213. The memory 213 includes a ROM (Read Only Memory) and a RAM (Random Access Memory). The ROM stores a control program and various operation parameters which are used by the CPU 212. The RAM stores various results calculated by the CPU 212.

An electron multiplying gate drive unit 218 controls an electron multiplying gate voltage applying signal 219 which is applied to the electron multiplying CCD image pickup device 203 based on an electron multiplying gain control signal 215 which is provided by the main control unit 211. The electron multiplying gate voltage applying signal 219 is sent to the electron multiplying CCD image pickup device 203 via an electron multiplying gate input terminal 221. A test signal generating unit 222 generates a test signal 223 which is provided to a test signal inputting terminal 224 of the electron multiplying CCD image pickup device 203, based on a reference level control signal 216 received from the main control unit 211. A switching signal 217 provided by the main control unit 211 is sent to a switching signal inputting terminal 225 of the electron multiplying CCD image pickup device 203.

Figure 3:
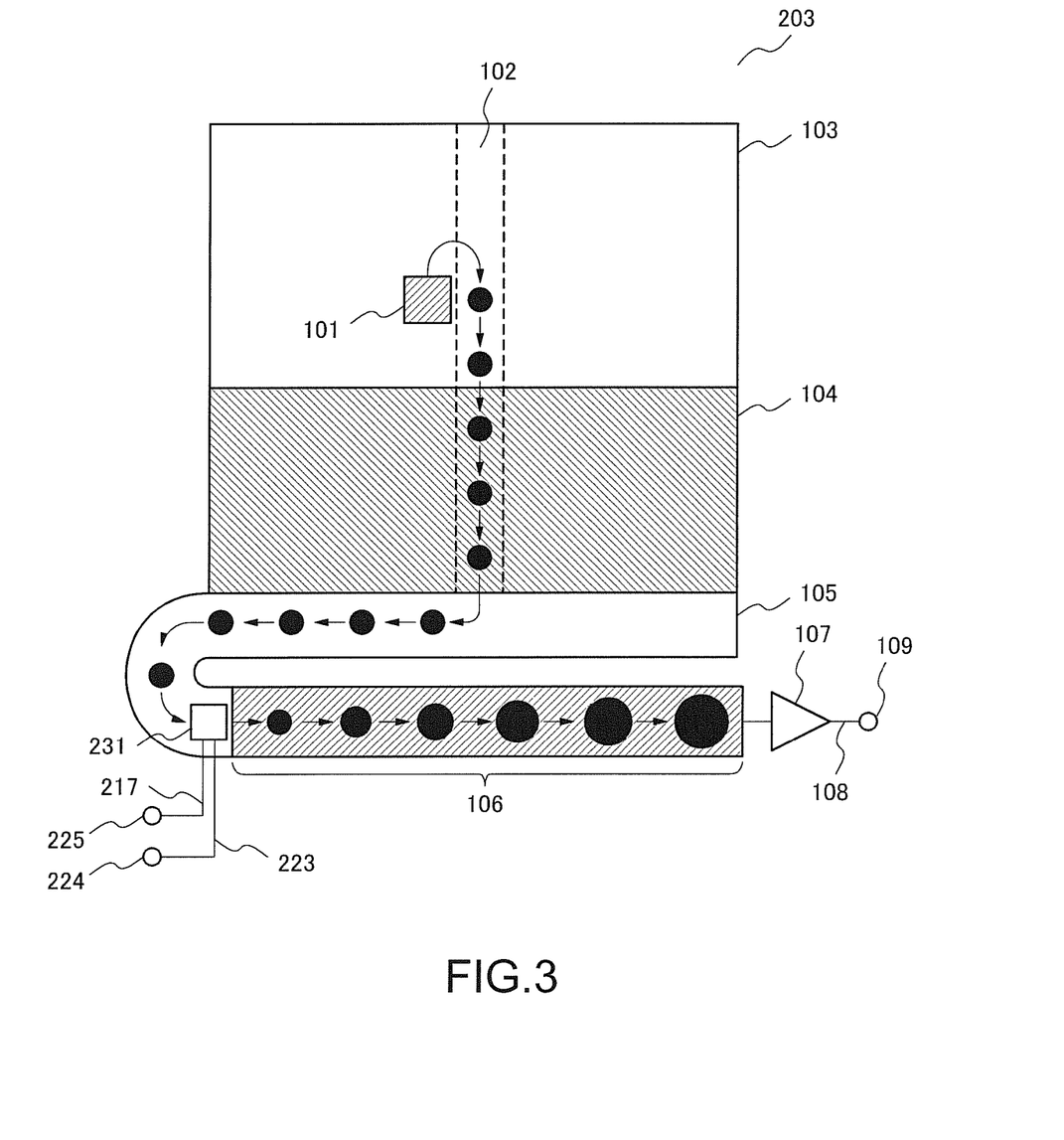
FIG. 3 shows a basic operation of the electron multiplying CCD image pickup device shown in FIG. 2.

FIG. 3 shows a basic operation and an example of a configuration of the electron multiplying CCD image pickup device 203 shown in FIG. 2. Following descriptions on FIG. 3 do not include descriptions which are already described about FIG. 8, and use the same reference numbers for the same elements as those in FIG. 8. The electron multiplying CCD image pickup device 203 of the exemplary embodiment includes an input signal switching unit 231 which the electron multiplying CCD image pickup device 100 does not include. The input signal switching unit 231 is arranged at a position ahead of the electron multiplying CCD register 106. The input signal switching unit 231 has two input ports, that is, one input port for the transferred signal (that is, image pickup signal) from the horizontal CCD register 105, and the other input port for the test signal 223 provided by the test signal inputting terminal 224. The input signal switching unit 231 selects either the image pickup signal or the test signal 223 and outputs the selected signal. The selected signal enters the electron multiplying CCD register 106, and then, the selected signal is multiplied therein. The above-mentioned signal selection is carried out according to the switching signal 217 provided to the switching signal inputting terminal 225.

That is, according to the switching signal 217 which selects either a normal mode or a test mode, the image pickup signal is selected and multiplied at a normal mode, while the test signal is selected and multiplied at a test mode. The electron multiplying CCD register 106 carries out the same multiplying process for every input signal.

Figure 4:
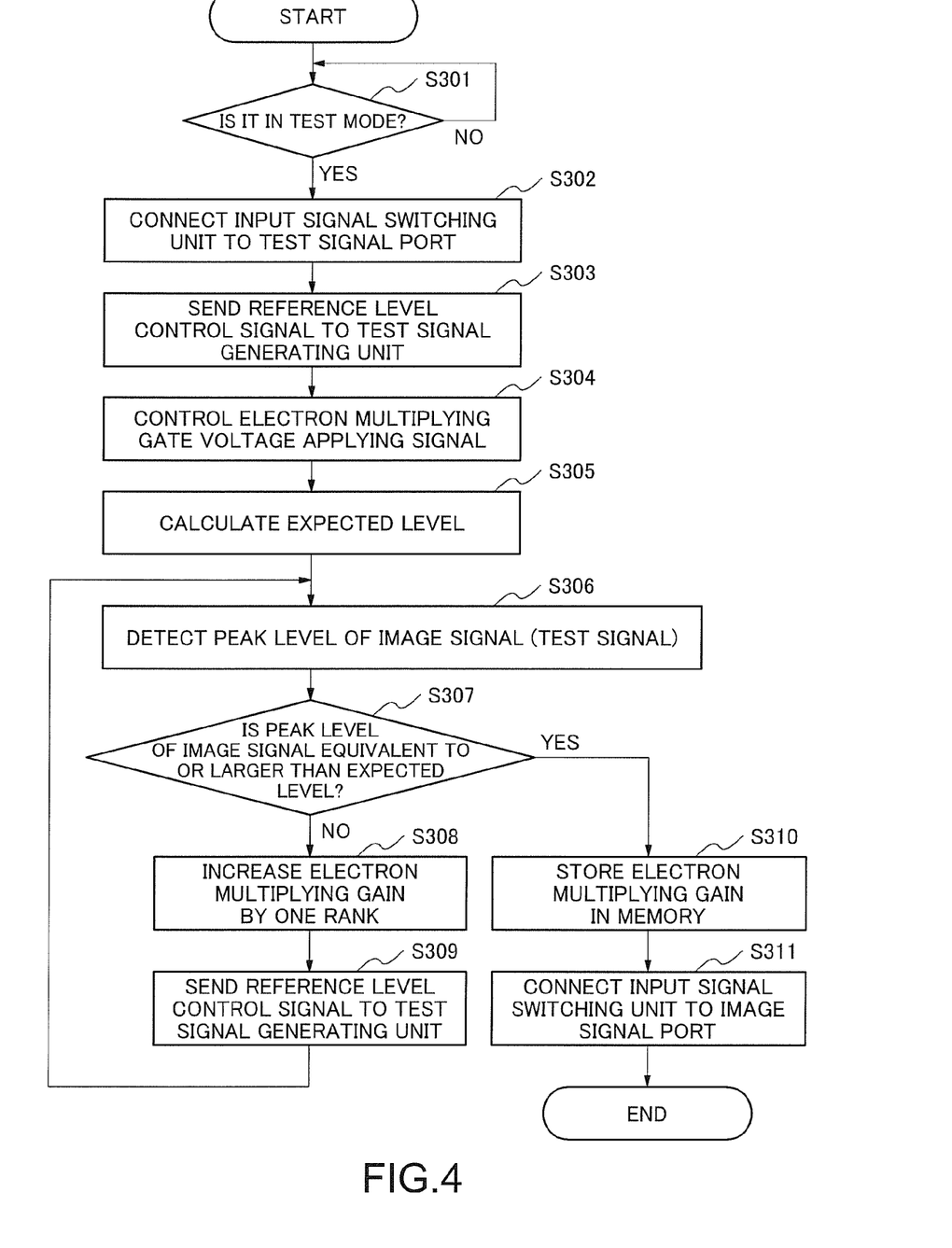
FIG. 4 is a flowchart illustrating a first example of an operation of the electron multiplying solid-state image pickup apparatus according to the second embodiment of the present invention.

FIG. 4 is a flowchart illustrating a first example of operations of the above mentioned electron multiplying solid-state image pickup apparatus according to the second exemplary embodiment of the present invention. Further, FIG. 4 will be described in the following, with reference to FIG. 2 and FIG. 9. The main control unit 211 may come into a test mode, every time a timer installed in the electron multiplying image pickup apparatus 200 counts one month, or every time user turns on a test mode switch of an operation panel (not illustrated).

On entering the test mode (YES in step S301), the main control unit 211 provides the switching signal 217 selecting the test signal 223 to the input signal switching unit 231 (step S302). The input signal switching unit 231 which receives the switching signal 217 sends the test signal 223 to the electron multiplying CCD register 106.

The main control unit 211 sends the reference level control signal 216 to the test signal generating unit 222 (S303). On reception of the reference level control signal 216, the test signal generating unit 222 outputs the test signal 223 with a reference level to one input port of the input signal switching unit 231.

The main control unit 211 sends the electron multiplying gain control signal 215 to the electron multiplying gate drive unit 218 (step S304). The electron multiplying gate drive unit 218 outputs the electron multiplying gate voltage applying signal 219 (for example, 19.2 V) which can make a predetermined electron multiplying gain (for example, 1000) to the electron multiplying CCD image pickup device 203 via the electron multiplying gate input terminal 221.

The main control unit 211 calculates an expected image signal level without influence of the electron multiplying gain shift due to aging (step S305). The expected level is calculated, for example, based on the reference level of the test signal which is set in the test signal generating unit 222 and the electron multiplying gain which is set in the electron multiplying gate drive unit 218.

The test signal whose electrons are multiplied after passing the electron multiplying register 106 is converted to the voltage signal 204 in a time-series manner. The voltage signal 204 is provided to the image signal processing unit 205. The image signal level detecting part 208 in the image signal processing unit 205 detects a peak level of an image signal in the voltage signal 204 (i.e. the test signal), and sends the peak level to the main control unit 211 as the peak level signal of image signal 209 (S306). The main control unit 211 determines whether or not the peak level signal of image signal 209 of the test signal is smaller than the expected level calculated in step S305 (step S307). When the peak level signal of image signal 209 of the test signal is smaller than the expected level (NO in step S307), the main control unit 211 judges that the aging occurs in the electron multiplying CCD image pickup device 203. The main control unit 211 issues an instruction to increase the electron multiplying gain by one rank to the electron multiplying gate drive unit 218 (step S308).

The main control unit 211 instructs the test signal generating unit 222 to output the test signal with the reference level, when the electron multiplying gain is increased by one rank (step S309). Then, the image signal level detecting part 208 detects the peak level signal of image signal 209 under the condition of the updated electron multiplying gain. The main control unit 211 determines again whether or not the peak level signal of image signal 209 is smaller than the expected level. When the peak level signal of image signal 209 of the test signal is smaller than the expected level again, the procedure mentioned above is repeated until the peak level signal of image signal 209 becomes equal to the expected level.

When the peak level signal of image signal 209 becomes equal to or larger than the expected level, the main control unit 211 stores the electron multiplying gain obtained at that time in the memory 213 (step S310). The main control unit 211 controls the input signal switching unit 231 so that a normal signal (that is, not the test signal but the image pickup signal) may be sent to the electron multiplying CCD register 106 (step S311).

The main control part 211 can easily adjust the electron multiplying gate voltage according to the electron multiplying gain which makes the peak level signal of image signal 209 not smaller than the expected level. For example, the main control unit 211 can instruct the electron multiplying gate drive circuit 218 to apply a voltage corresponding to the electron multiplying gain above-described until a next test mode. That is, because the electron multiplying gain is adjusted at every test mode, influence due to the aging can be minimized. Accordingly, the electron multiplying CCD image pickup device 203 can keep good gain characteristics.

Furthermore, the main control unit 211 may define a mount of gain shift that is a difference between the updated electron multiplying gain and the electronic multiplying gain without the gain shift. The aging can be minimized, if the electron multiplying gain is determined in consideration of the amount of the gain shift. Therefore, the electron multiplying CCD image pickup device 203 can keep good gain characteristics.

According to the first example of operations described above, the test is carried out while the electron multiplying CCD image pickup apparatus 200 is not in use, and the gain is adjusted when the gain shift is found through the test. Therefore, it is impossible to pick up an image of subject while the electron multiplying CCD image pickup apparatus 200 is in use.

According to a second example of operations described below, the adjustment for the gain shift is carried out, even if the electron multiplying CCD image pickup apparatus 200 is imaging a subject.

Figure 5:
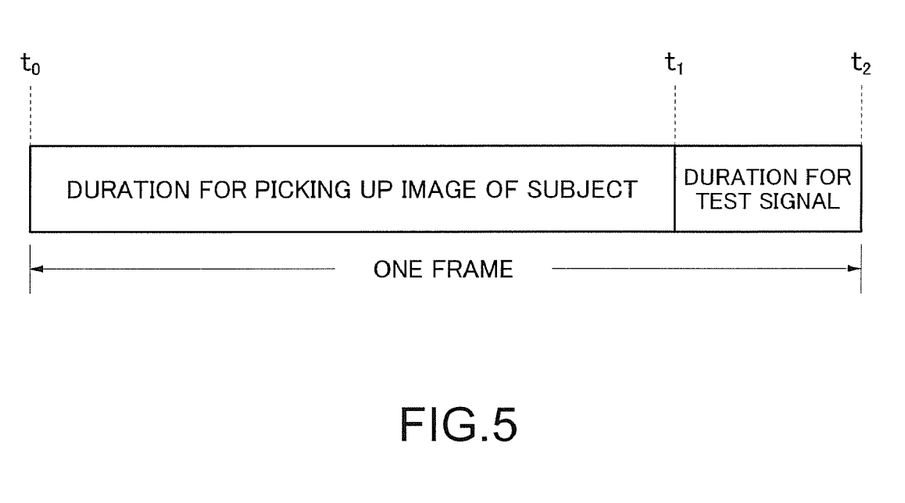
FIG. 5 shows a frame format of image signal which is used on carry out a second operation of the electron multiplying solid-state image pickup apparatus according to the second embodiment of the present invention.

FIG. 5 shows a frame format of the image signal which is used in the second operations of the electron multiplying solid-state image pickup apparatus according to the second exemplary embodiment of the present invention. In FIG. 5, an interval of one frame for one image of a subject corresponds a duration between time t0 and time t2. In a motion picture, the image per one frame is outputted at the rate of 30 times per second from the electron multiplying CCD image pickup apparatus 200.

In the second example of operations, the duration between the time t0 and the time t1 is assigned for picking up an image of a subject. Moreover, the duration between the time t1 and the time t2 is assigned for the test signal which includes no influence to picking up the image of the subject. While the duration for the test is positioned at an end region of the frame as shown in FIG. 5, the duration for the test can be arranged, for example, at a beginning area of the frame.

Figure 6:
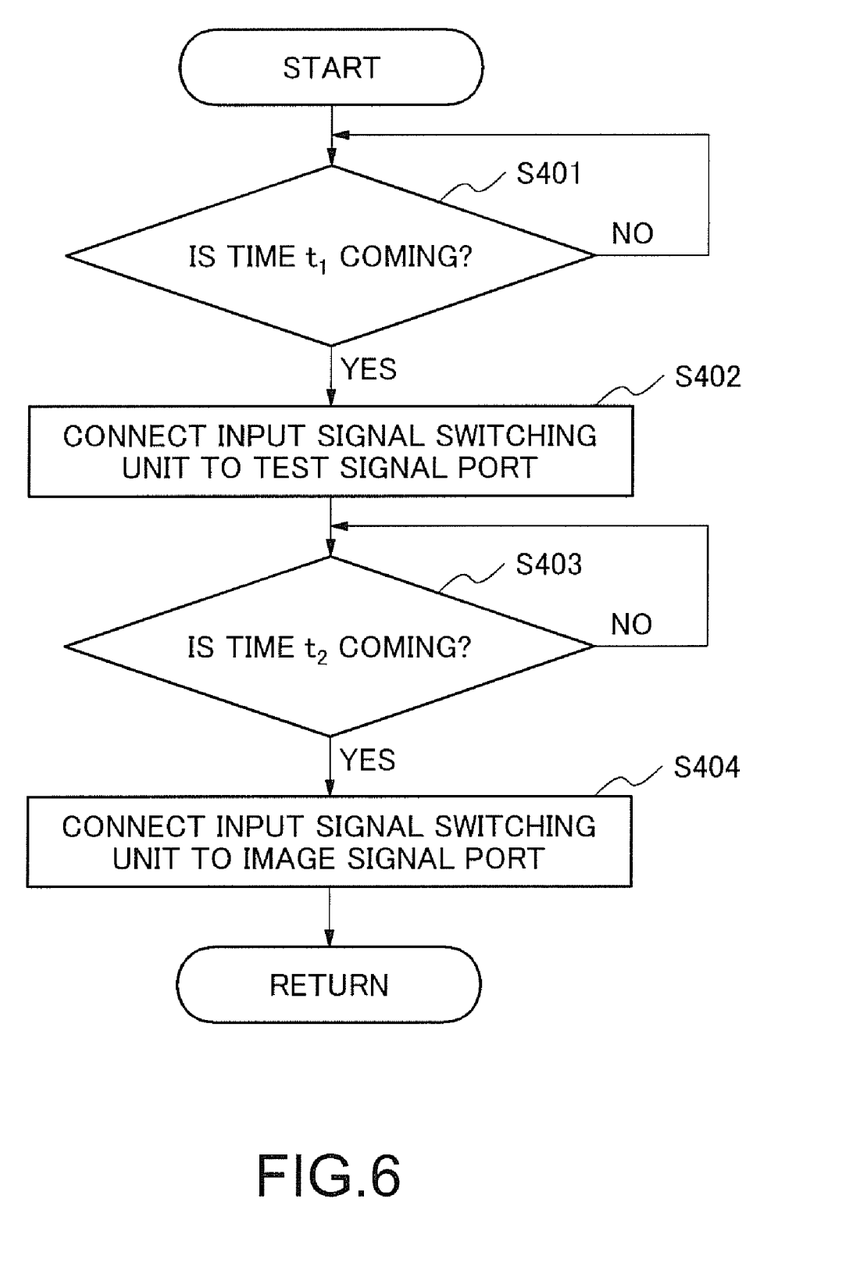
FIG. 6 is a flowchart illustrating an operation for switching an input signal among the second operation of the electron multiplying solid-state image pickup apparatus according to the second embodiment of the present invention.

FIG. 6 is a flowchart illustrating the second example of operations for switching an input signal in the electron multiplying solid-state image pickup apparatus according to the second exemplary embodiment of the present invention. In the second example of operations, a time when the signal charge which is located at the starting position of the frame passes the input signal switching unit 231 is defined to be the time t0. The main control part 211 includes a timer (not illustrated). Whenever the signal charge passes the input signal switching unit 231, the timer starts to measure elapsed time. When the timer detects the time t1 (YES in step S401), the main control unit 211 transmits the switching signal 217 to the electron multiplying CCD image pickup device 203 and controls the input signal switching unit 231 to select the input port of the test signal 223 (step S402).

When the timer detects the time t2 (YES in step S403), the main control unit 211 controls the input signal switching unit 231 to select the input port for the transferred signal (that is, image pickup signal) again (step S404). When the image including a plurality of continuous frames is picked up, the timer is reset at the starting position of every frame, and the above mentioned operations are repeated. The timer measures elapsed time in order to determine an image pickup duration and a test signal duration in the step S401. Alternatively, it is possible to discriminate between the image pickup duration and the test signal duration according to polarity of the blanking signal, because the polarity of the blanking signal during picking up the image is different from that of other duration.

Figure 7:
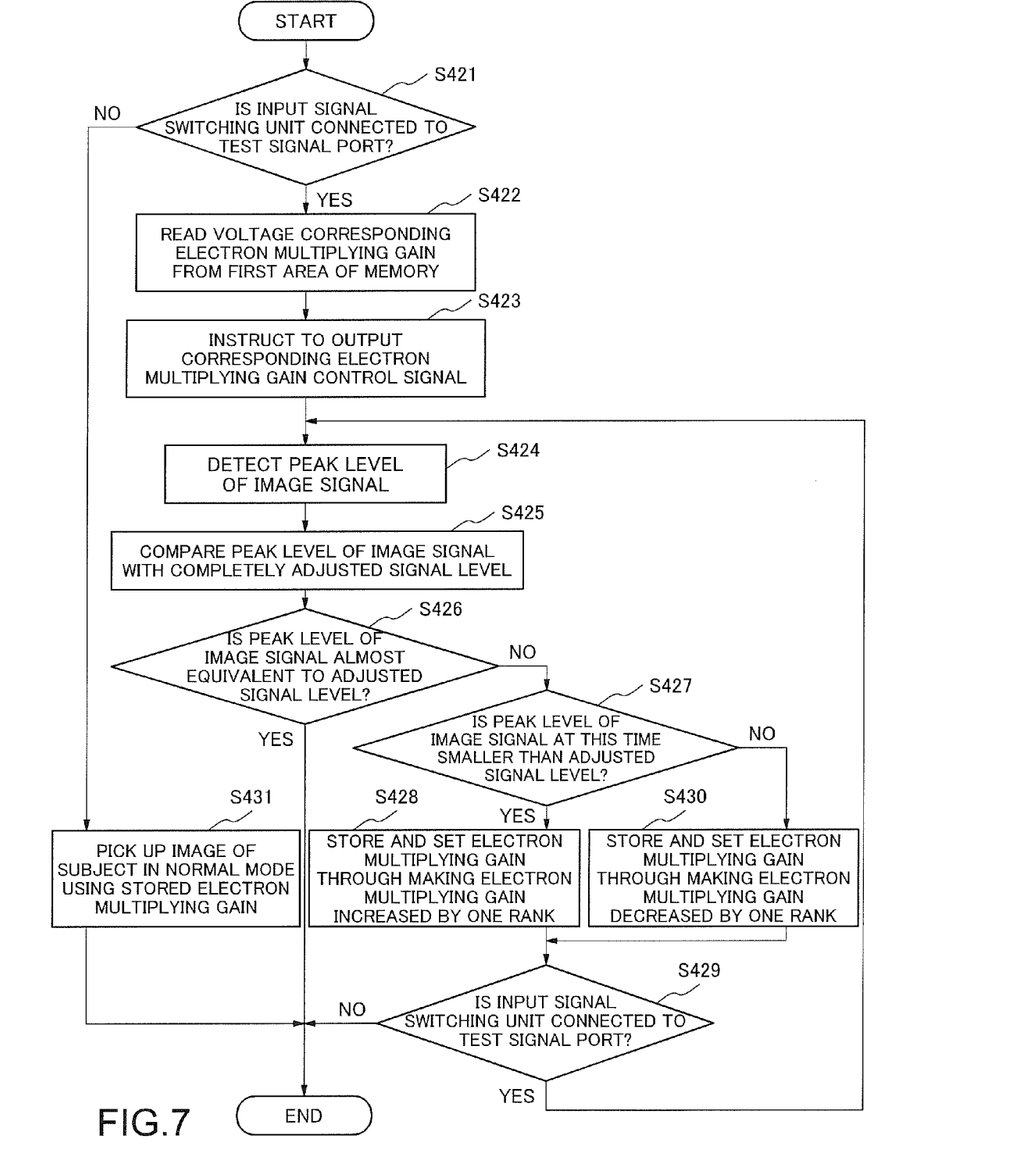
FIG. 7 is a flowchart illustrating an operation for controlling an electron multiplying gain among the second operation of the electron multiplying solid-state image pickup apparatus according to the second embodiment of the present invention.

FIG. 7 is a flowchart illustrating a second example of operations for controlling the electron multiplying gain in the electron multiplying solid-state image pickup apparatus according to the second exemplary embodiment of the present invention. The main control unit 211 checks whether or not the input signal switching unit 231 is controlled to select the test signal (step S421). When the input signal switching unit 231 is controlled to select the test signal (YES in step S421), the main control unit 211 reads a voltage used last time corresponding to the previous electron multiplying gain from an first area in the memory 213 (step S422). Then, the main control unit 211 transmits the electron multiplying gain control signal 215 indicating the voltage to the electron multiplying gate drive circuit 218. Then, the electron multiplying gate drive circuit 218 outputs the electron multiplying gate voltage applying signal 219 (step S423) based on the electron multiplying gain control signal 215, so that the electron multiplying gain may be equal to the previous gain.

The image signal level detecting part 208 of the image signal processing unit 205 detects the peak level of image signal and outputs the peak level as the peak level signal of image signal 209 to the main control unit 211 (step S424). The main control unit 211 compares the peak level signal of image signal 209 with a measured value of an adjusted signal level which has been adjusted in the last test (step S425). The measured value of the adjusted signal level is stored in a second area of the memory 213. The measured value of the adjusted signal level may be stored in the memory at the time of shipping from factory.

According to a result of the comparison, the main control unit 211 judges that the electron multiplying CCD image pickup device 203 does not include aging, and terminates control procedures for the electron multiplying gain, when the peak level signal of image signal 209 detected at this time is almost equal to the measured value of the adjusted signal level (YES in step S426).

Meanwhile, the main control unit 211 judges whether or not the peak level signal of image signal 209 detected at this time is smaller than the measured value of the adjusted signal level (step S427), when the peak level signal of image signal 209 is not almost equal to the measured value of the adjusted signal level (NO in step S426). When the peak level signal of image signal 209 is smaller than the measured value of the adjusted signal level (YES in step S427), the main control unit 211 judges that the electron multiplying gain has shifted. Then, the main control unit 211 increases the electron multiplying gain by one rank, stores the increased electron multiplying gain in the first area of the memory 213 and increases the electron multiplying gain of the electron multiplying CCD image pickup device 203 by one rank by using the electron multiplying gain control signal 215 (step S428).

The main control unit 211 checks whether or not the input signal switching unit 231 is controlled to select the test signal (step S429). When the input signal switching unit 231 still selects the test signal (YES in step S429), the main control unit 211 detects the peak level signal of image signal 209 which is outputted when the electron multiplying gain increases by one rank (step S424). The main control unit 211 compares the newly detected peak level signal of image signal 209 with the measured value of the adjusted signal level stored in the second area of the memory 213 (step S425) and judges which is larger (step S426 and step S427).

In this way, the electron multiplying gain is increased by ranks while the input signal switching unit selects the test signal. When the peak level signal of image signal 209 becomes almost equal to the signal level detected at the previous time, the control procedures for the electron multiplying gain is terminated.

Meanwhile, when the peak level signal of image signal 209 is larger than the measured value of the adjusted signal level (NO in step S427), the main control unit 211 judges that the electron multiplying gain increases due to some causes other than the gain shift. In such a case, the main control unit 211 decreases the electron multiplying gain by one rank and stores the decreased electron multiplying gain in the second area of the memory 213. Then, the main control unit 211 decreases the electron multiplying gain of the electron multiplying CCD image pickup device 203 by one rank (step S430).

The main control part 211 checks whether or not the input signal switching unit 231 is controlled to select the test signal (step S429). When the input signal switching unit 231 still selects the test signal (YES in step S429), the main control unit 211 detects the peak level signal of image signal 209 which is outputted when the electron multiplying gain is decreased by one rank. The main control unit 211 compares the newly detected peak level signal of image signal 209 with the measured value of the adjusted signal level stored in the second area of the memory 213 (step S425) and judges which is larger (step S426 and step S427).

In this way, the electron multiplying gain decreases by one rank while the input signal switching unit selects the test signal. When the peak level signal of image signal 209 becomes almost equal to the measured value of the adjusted signal level, the control procedures of the electron multiplying gain is terminated. According to the above mentioned control, even if the electron multiplying gain becomes excessive due to noise, the electron multiplying gain can be adjusted to an appropriate gain.

Furthermore, when the input signal switching unit 231 is controlled not to select the test signal in step S421 (no in step S421), normal mode image pickup is carried out using the latest electron multiplying gain stored in the above mentioned area of the memory 213 (step S431).

According to the second example of operations described above, the test and the adjustment of the electron multiplying gain are carried out in a duration in which images of a subject is not picked up. Accordingly, it is not necessary to temporarily stop picking up images in order to perform the test and the adjustment of the electron multiplying gain. Moreover, the main control unit 211 compares the peak level signal of image signal 209 detected in the test procedures with the adjusted signal level stored in the second area of the memory 213. Accordingly, it is not necessary to calculate the expected value.

Further, the solid-state image pickup device described above is not limited to the CCD type. The other solid-state image pickup device, for example, a CMOS (complementary metal-oxide semiconductor) type solid-state image pickup device, is also applicable to the invention. Furthermore, a specific configuration of means for multiplying electrons using impact ionization is not limited to the configuration shown in FIG. 9. For example, the number of the horizontal transfer gate electrodes may be equal to or larger than 3. Furthermore, the electron multiplying method is not limited to one based on the impact ionization method.

An electron multiplying image pickup apparatus according to a third exemplary embodiment of the present invention includes (a) image pickup means including a photoelectric conversion element, (b) charge transfer means which transfers signal charge provided by the photoelectric conversion element of the image pickup means, (c) electron multiplying means which multiplies electrons using impact ionization by applying an electric field generated by the gate electrode to the signal charge transferred by the charge transfer means, (d) test mode charge injection means which stops transferring the charge by the charge transfer means in a test mode for adjusting voltage applied to the gate electrode, and injects a standard amount of electric charge into position ahead of the gate electrode every unit time in stead of the charge transfer by the charge transfer means, (e) comparison means which compares an amount of the transferred charge per the unit time which is obtained through multiplying the charge injected by the test mode charge injection means with a predetermine value, and (f) electric field strength adjusting means which adjusts strength of the electric field which is generated by the gate electrode so that the amount of transferred charge becomes equal to the predetermined value.

That is, according to the exemplary embodiment, the electron multiplying image pickup apparatus multiplies, using impact ionization, the signal charge outputted from the photoelectric conversion element of the image pickup means due to an incident light thereto, and outputs the multiplied signal charge. The electron multiplying image pickup apparatus includes a test mode charge injection means which stops transferring the charge by the charge transfer means in the test mode for adjusting a voltage applied to the gate electrode, and injects a standard amount of charge into a position ahead of the gate electrode every unit time in stead of the charge transfer by the charge transfer means. Moreover, the electron multiplying image pickup apparatus includes the comparison means which compares the amount of the transferred charge per the unit time, which is obtained by multiplying the charge injected by the test mode charge injection means, with the predetermined value, and the electric field strength adjusting means which adjusts strength of the electric field, which is generated by the gate electrode, so that the amount of transferred charge may be equal to the predetermined value. As mentioned above, the electron multiplying image pickup apparatus can easily adjust the gain shift due to the aging through adjusting the voltage applied to the gate electrode using a feed back method for feeding back the comparison result.

Here, the test mode charge injection means may stop transferring the charge by the charge transfer means every time a predetermined time elapses, and may inject a standard amount of charge into a position ahead of the gate electrode in stead of the charge transfer. Furthermore, the test mode charge injection means may inject a standard amount of charge into a position ahead of the gate electrode every time the signal charge, which exists in the specific duration included in one frame of the image signal provided by the image pickup means, is transferred. The latter means can always monitor the gain shift due to the aging during the duration not for picking up images. In the former means, the control is easy since the test is carried out after elapse of a predetermined time. Moreover, the former means does not generate trouble that the adjustment temporarily makes an image having different quality during picking up motion images.

CCD is a typical photoelectric conversion element applied to the embodiment. However, the photoelectric conversion element is not limited to the CCD. Any of an electron multiplying image pickup apparatus which multiplies the electron using impact ionization is applicable to the invention. For example, CMOS (Complementary Metal Oxide Semiconductor) type solid-state image pickup device is applicable to the present invention.

A computer program for adjusting an electron multiplying image pickup apparatus according to a fourth exemplary embodiment of the present invention is processed by a computer of the electron multiplying image pickup apparatus which includes an image pickup means including a photoelectric conversion element, a charge transfer means which transfers signal charge provided by the photoelectric conversion element of the image pickup means, and an electron multiplying means which multiplies electrons using impact ionization through applying electric field, which is generated by gate electrode, to the signal charge transferred by the charge transfer means. The computer with the adjustment program carries out (a) a test mode charge injection process that stops transferring charge by the charge transfer means in a test mode for adjusting voltage applied to the gate electrode, and injects a standard amount of charge into a position ahead of the gate electrode every unit time in stead of the charge transfer by the charge transfer means, (b) a comparison process that compares an amount of the transferred charge per the unit time, which is obtained through multiplying the injected charge by the test mode charge injection means, with a predetermine value, and (c) an electric field strength adjusting process that adjusts strength of the electric field which is generated by the gate electrode so that the amount of transferred charge may be equal to a predetermined value.

That is, the fourth embodiment realizes a technological thought of the third embodiment as a computer program for adjustment of the electron multiplying image pickup apparatus.

A method for adjusting an electron multiplying image pickup apparatus according to a fifth exemplary embodiment of the present invention includes (a) a test mode charge injection step of, in a test mode for adjusting voltage applied to a gate electrode of the electron multiplying image pickup apparatus which includes an image pickup means having a photoelectric conversion element, a charge transfer means which transfers signal charge provided by the photoelectric conversion element of the image pickup means, and an electron multiplying means which multiplies electrons using impact ionization through applying electric field, which is generated by the gate electrode, to the signal charge transferred by the charge transfer means, stopping transferring the charge by the charge transfer means, and injecting a standard amount of charge into a position ahead of the gate electrode every unit time in stead of the charge transfer by the charge transfer means, (b) a comparison step of comparing an amount of the transferred charge per the unit time, which is obtained through multiplying the injected charge, with a predetermine value, and (c) an electric field strength adjusting step of adjusting strength of the electric field which is generated by the gate electrode so that the amount of transferred charge may be equal to a predetermined value.

That is, the embodiment realizes a technological thought of the third embodiment as a method for adjusting the electron multiplying image pickup apparatus.

In an electron multiplying CCD image pickup device 100 shown in FIG. 8 using impact ionization, which is disclosed in Japanese Patent Application Laid-Open No. 2007-274050, an electron multiplying gate voltage to provide a predetermined electron multiplying gain may shift toward high voltage with age. A characteristic curve 162 indicated by dotted line in FIG. 10 is a curve which is shifted from a position of the characteristic curve 161 toward high voltage by approximately 2 V (volt) due to aging. Before the aging occurs, the electron multiplying gate voltage is set to, for example, about 19.2 V. According to the characteristic curve 161 in FIG. 10, when the electron multiplying gate voltage is set to 19.2 V, the electron multiplying gain keeps about 1000. However, when the characteristic curve 162 shifts from the initial position toward high voltage due to the aging, the electron multiplying gain becomes approximately zero even if the electron multiplying gate voltage is set to the initial voltage (i.e. about 19 V). Due to large change of the electron multiplying gain, stable operations of a camera using the electron multiplying CCD image pickup device 100 are interrupted.

According to one theory, it is considered to be one cause of the aging that some of the signal charge (known as a hot electron) accelerated by the large potential difference, or some of the electrons or the holes generated using impact ionization are injected into gate oxide film, and become trapped in deep potential well. However, the real cause has not yet been clarified at the present time. Accordingly, any substantial solution to a disadvantage above mentioned has not yet been disclosed.

According to each embodiment of the present invention mentioned above, it is possible to adjust the gain shift due to the aging of the image pickup apparatus, which multiplies the electron using impact ionization, and keep the image pickup apparatus stable easily. Furthermore, it is also possible to adjust the amplification gain ratio change due to the environmental factor like temperature with the similar procedure.

The previous description of embodiments is provided to enable a person skilled in the art to make and use the present invention. Moreover, various modifications to these embodiments will be readily apparent to those skilled in the art, and the generic principles and specific examples defined herein may be applied to other embodiments without the use of inventive faculty. Therefore, the present invention is not intended to be limited to the embodiments described herein but is to be accorded the widest scope as defined by the limitations of the claims and equals.

Further, it is noted that the inventor's intent is to retain all equals of the claimed invention even if the claims are amended during prosecution.

What is claimed is:

1. An electron multiplying solid-state image pickup apparatus which obtains a desired electron multiplying gain through adjusting a voltage applied to an electron multiplying gate electrode, comprising:
    an electron multiplying unit which multiplies an electron corresponding to an input signal by an electric field generated by said applied voltage;
    a test signal supply unit which supplies a test signal to said electron multiplying unit; and
    a control unit which compares a level of said test signal multiplied by said electron multiplying unit with an expected level determined in advance, and adjusts said voltage applied to said electron multiplying gate electrode so that said multiplied test signal level is equal to or larger than said expected level.

2. The electron multiplying solid-state image pickup apparatus according to claim 1, wherein
    said control unit calculates a difference between an electron multiplying gain which is generated when said multiplied test signal level becomes equal to or larger than said expected level, and an electron multiplying gain which is generated when gain shift does not occur, and adjusts said electron multiplying gain based on said difference.

3. The electron multiplying solid-state image pickup apparatus according to claim 1, further comprising:
    a transfer unit which transfers signal charge provided by a photoelectric conversion element to said electron multiplying unit;
    a signal selecting unit which is arranged at a position ahead of said electron multiplying unit and selects a signal to be multiplied by said electron multiplying unit from a signal provided by said transfer unit and said test signal provided by said test signal supply unit.

4. The electron multiplying solid-state image pickup apparatus according to claim 3, wherein
    when a predetermined time elapses, said control unit controls said signal selecting unit and said test signal supply unit to supply said electron multiplying unit with said test signal.

5. The electron multiplying solid-state image pickup apparatus according to claim 3, wherein
    said control unit controls said signal selecting unit and said test signal supply unit to supply said electron multiplying unit with said test signal, while said signal charge to be transferred by said transfer unit exists in a specific area of a predetermined image.

6. The electron multiplying solid-state image pickup apparatus according to claim 1, wherein said solid-state image pickup apparatus is CCD (Charged Coupled Device) type solid-state image pickup apparatus.

7. A method for adjusting an electron multiplying gain of an electron multiplying solid-state image pickup apparatus which obtains a desired electron multiplying gain through adjusting a voltage applied to an electron multiplying gate electrode, comprising:

supplying a test signal to an electron multiplying unit which multiplies an electron corresponding to an input signal by an electric field generated by said applied voltage;

comparing a level of said test signal multiplied by said electron multiplying unit with an expected level determined in advance; and adjusting said voltage applied to said electron multiplying gate electrode so that said multiplied test signal level is equal to or larger than said expected level.

8. The method for adjusting the electron multiplying gain according to claim 7, further comprising:

calculating a difference between an electron multiplying gain which is generated when said multiplied test signal level becomes equal to or larger than said expected level, and an electron multiplying gain which is generated when gain shift does not occur, and adjusting said electron multiplying gain based on said difference.

9. The method for adjusting the electron multiplying gain according to claim 7, further comprising:

selecting a signal to be multiplied by said electron multiplying unit from a signal provided by a transfer unit which transfers signal charge provided by a photoelectric conversion element to said electron multiplying unit and said test signal provided by said test signal supply unit.

10. The method for adjusting the electron multiplying gain according to claim 7, wherein supplying said electron multiplying unit with said test signal, when a predetermined time elapses.

11. The method for adjusting the electron multiplying gain according to claim 9, wherein supplying said electron multiplying unit with said test signal, while said signal charge to be transferred by said transfer unit exists in a specific area of a predetermined image.

12. A computer program product for adjusting an electron multiplying gain of an electron multiplying solid-state image pickup apparatus which obtains a desired electron multiplying gain through adjusting a voltage applied to an electron multiplying gate electrode, said computer program product comprising: a computer-readable storage medium having computer-readable program code portions stored therein, said computer-readable program code portions comprising:

a first executable portion configured to supply a test signal to an electron multiplying unit which multiplies an electron corresponding to an input signal by an electric field generated by said applied voltage;

a second executable portion configured to compare a level of said test signal multiplied by said electron multiplying unit with an expected level determined in advance; and a third executable portion configured to adjust said voltage applied to said electron multiplying gate electrode so that said multiplied test signal level is equal to or larger than said expected level.

13. An electron multiplying solid-state image pickup apparatus which obtains a desired electron multiplying gain through adjusting a voltage applied to an electron multiplying gate electrode, comprising:

electron multiplying means for multiplying an electron corresponding to an input signal by an electric field generated by said applied voltage;

test signal supply means for supplying a test signal to said electron multiplying unit; and controlling means for comparing a level of said test signal multiplied by said electron multiplying unit with an expected level determined in advance, and adjusting said voltage applied to said electron multiplying gate electrode so that said multiplied test signal level is equal to or larger than said expected level.

* * * * *